Sept. 9, 1952  J. B. PETERSON  2,609,686
AIR-SPEED INTEGRATOR
Filed May 14, 1946  2 SHEETS—SHEET 1

Inventor
JOHN B. PETERSON
By Strauch + Hoffman
Attorneys

Sept. 9, 1952  J. B. PETERSON  2,609,686
AIR-SPEED INTEGRATOR
Filed May 14, 1946  2 SHEETS—SHEET 2

Inventor
JOHN B. PETERSON

By *Strauch + Hoffman*
Attorneys

Patented Sept. 9, 1952

2,609,686

UNITED STATES PATENT OFFICE 2,609,686

AIR-SPEED INTEGRATOR

John B. Peterson, Bethesda, Md.; Ruth L. Peterson administratrix of said John B. Peterson, deceased Application May 14, 1946, Serial No. 669,548

6 Claims. (Cl. 73—183)

This invention relates to instruments for integrating the true air speed of aircraft, for use in the determination of the air distance traveled and for the operation of air position indicators.

The need for accurate and reliable equipment for totalizing the air distance traveled by aircraft has been recognized for a long time. Several types of air logs have been devised but none have proven to be entirely satisfactory. It has been found to be possible to design an electrical circuit to charge and discharge a condenser alternately and repeatedly at a frequency which is proportional to the true air speed as a function of the static pressure, Pitot-static differential pressure and air temperature. The total of charge-discharge cycles is a measure of the air distance traveled and the frequency of the charge-discharge cycles is a measure of the true air speed.

Accordingly it is an object of this invention to provide simple, reliable and accurate means for integrating the true air speed of aircraft as derived from the static pressure, the Pitot-static differential pressure and the air temperature. It is a further object of the invention to provide an instrument which will calculate the air distance as a function of the apparent temperature rather than the true temperature of the air. It is a still further object to provide equipment in which all delicate parts will be adaptable to hermetic sealing in an inert gas. It is a still further object to provide integrators such that their performance will be independent of fluctuations in the voltage of the D. C. supply which is required for their operation.

These and other objects which will be apparent as the description progresses are attained by mechanism illustrated in the accompanying drawings, in which—

Figure 1:
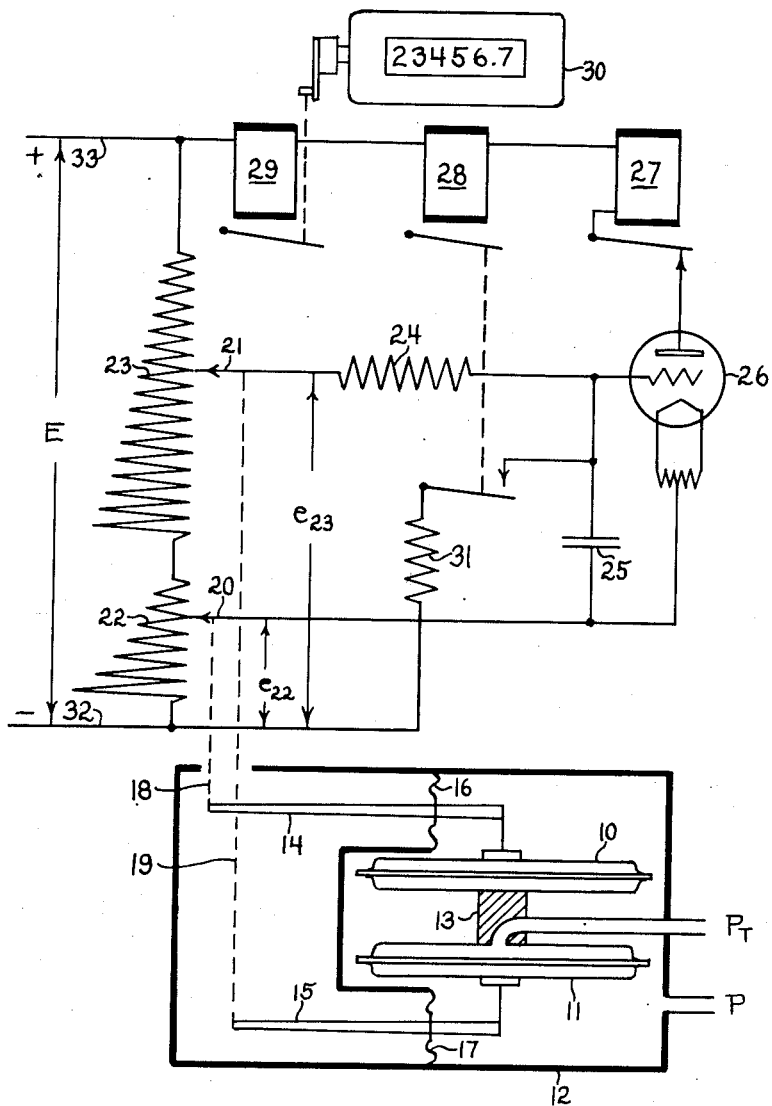
Figure 2:
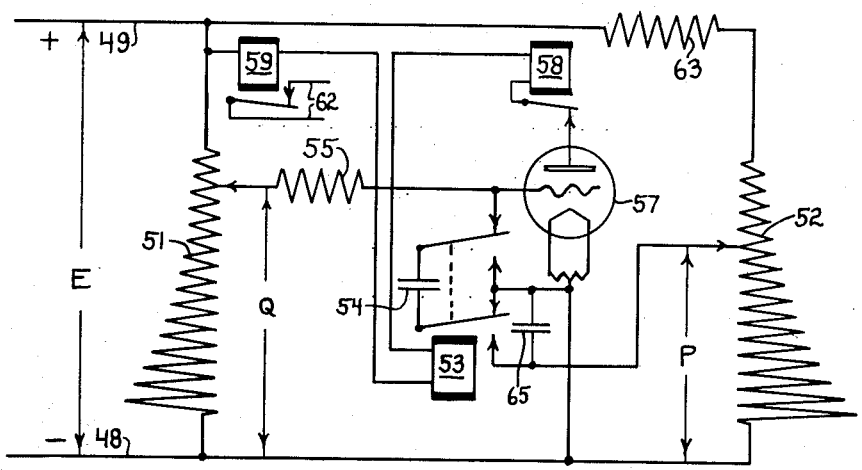
Figure 4:
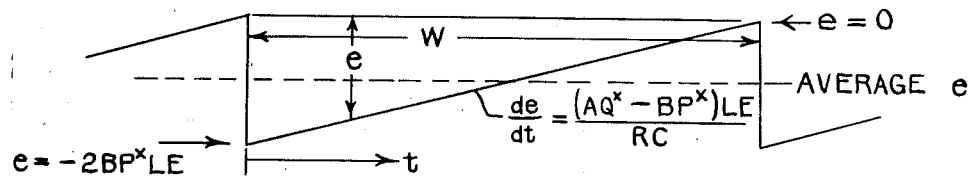
Figure 3:
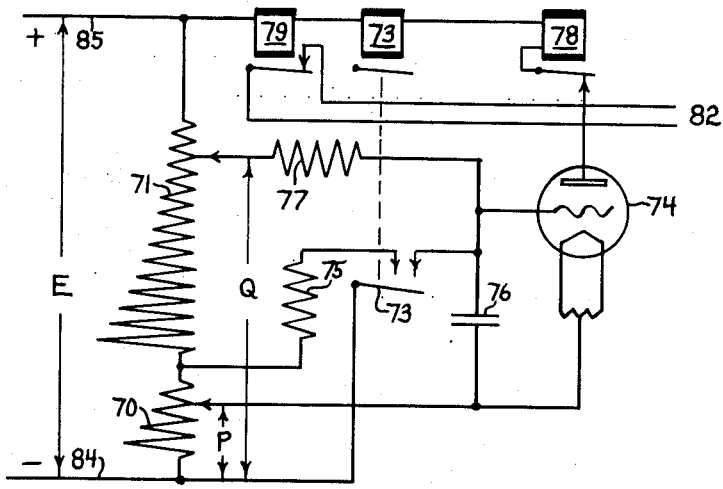

Figure 1 is a preferred form of the invention; Figure 2 is a schematic diagram of electrical connections for an alternate form; Figure 3 is an electrical diagram for a third form; Figure 4 is a graphical presentation of a condenser charge-discharge cycle.

Before taking up the figures in detail, certain mathematical theory relating to true air-speed indicators of the Pitot-static type will be presented. In developing this mathematical theory the following terminology will be used:

$V$ = true air speed.
$P$ = static pressure.
$P_T$ = the total or Pitot pressure.
$Q = P_T - P$ = the Pitot-static differential pressure.
$T$ = the temperature of the air in which the aircraft is flying, degrees centigrade absolute.
$U$ = the apparent temperature, equals T plus the adiabatic rise due to speed V.
$a$ = the speed of sound.
$M$ = the Mach number, $=V/a$.
$E$ = the voltage of the direct current supply.
$H$ = a constant, proportional to the adiabatic temperature rise of a temperature element.
$e$ = voltage.
$r$ = resistance.
$c$ = capacity.
$t$ = time.
$K, A, B$ and $x$ are constants, the values of which may be different for different equations.
$W$ = the period of a condenser charge-discharge cycle, seconds.
$S$ = the number of charge-discharge cycles per unit distance; $VWS=1$.
$L$ = a design constant selected so as to make the maximum value of $e_{23}=E$ (see Equations 11 and 12).
$F, F', F''$ etc. are used to express unique functions of one or more variables, as in Equation 2 below.

The following equation for subsonic air speeds has been derived from Equation 3a of National Advisory Committee for Aeronautics, Technical Report 420, published in 1932.

$$V=K\sqrt{\left[\left(1+\frac{Q}{P}\right)^{2/7}-1\right]T} \qquad (1)$$

or $$V=\left[F\left(\frac{Q}{P}\right)\right]\sqrt{T} \qquad (2)$$

The equation for supersonic speeds has been derived from Equations 3.1 and 3.2 given in "Aerodynamic Theory," vol. III, page 241, edited by W. F. Durand and published in 1940. It is:

$$\frac{P_T}{P}=\frac{7M^2-1}{6}\left(\frac{36}{35}+\frac{36/35}{7M^2-1}\right)^{3.5} \qquad (3)$$

where the Mach number, $M=V/a$, and $a$=the velocity of sound.

Since the velocity of sound, $a$, is independent of air pressure and varies directly as the square root of the absolute temperature, we can solve Equation 3 for $V$, and write:

$$V=\left[F'\left(\frac{Q}{P}\right)\right]\sqrt{T} \qquad (4)$$

This equation for supersonic speeds is similar to Equation 2 for subsonic speeds but the function takes a slightly different form.

For either subsonic or supersonic speeds we may write:

$$V^2 = \left[F''\left(\frac{Q}{P}\right)\right](U - HV^2) \qquad (5)$$

where $HV^2$ is the adiabatic temperature rise of the temperature element. H is a constant associated with the temperature element and dependent on its shape and construction. The constant H will also be different for different units of speed (knots, miles per hours, etc.). At 400 knots the correction may amount to 10 centigrade degrees.

From Equation 5 we get, $$V^2 = \frac{F''\left(\frac{Q}{P}\right)}{1 + \left[F''\left(\frac{Q}{P}\right)\right]H} \cdot U$$

We may then write, $$V = \left[F'''\left(\frac{Q}{P}\right)\right]\sqrt{U} \qquad (6)$$

Thus for any temperature element we can determine the value of the constant H and write a true air-speed equation, using the apparent temperature rather than the true temperature.

For a given air-speed range, either subsonic or supersonic, Equation 4 can be approximated by, $$V \approx A\left(\frac{Q}{P}\right)^x \sqrt{T} \approx A\frac{Q^x}{P^x}\sqrt{T} \qquad (7)$$

or a more accurate approximation, $$V \approx \left[A\left(\frac{Q}{P}\right)^x - B\right]\sqrt{T} \qquad (8)$$

Also, the following similar approximations can be written for Equation 6;

$$V \approx A\left(\frac{Q}{P}\right)^x \sqrt{U} \qquad (9)$$

and $$V \approx \left[A\left(\frac{Q}{P}\right)^x - B\right]\sqrt{U} \qquad (10)$$

To approximate the exact curve for a certain range, the values of the constants A, B and $x$ are selected so as to make the approximation equal to the accurate values at two points for Equation 9 or at three points for Equation 10.

Figure 1 shows a preferred form of the invention. Evacuated static pressure bellows 10 and Pitot-static differential pressure bellows 11 are mounted in compartment 12. This compartment is connected to a static pressure source at P and the inside of bellows 11 is connected to a Pitot or total pressure source at $P_T$. Both bellows are mounted on block 13 which is fixed to the case or compartment 12. These bellows operate levers 14 and 15 extending through and pivotally mounted by flexible diaphragm seals 16 and 17. Dashed lines 18 and 19 indicate that contactors 20 and 21 on potentiometers 22 and 23 are controlled respectively by static pressure bellows 10 and Pitot-static differential pressure bellows 11.

Current from contactor 21 flows through temperature element 24 to erase the negative charge which has been placed on condenser 25 at the end of the previous cycle, thus bringing the grid of thyratron tube 26 up to zero.

When the grid voltage reaches a definite value, assumed here to be zero, the tube fires and permits current to flow in the anode circuit. This anode current operates relays 27, 28 and 29 simultaneously.

Relay 27 is normally closed. The purpose of this relay is to break the anode current, thus setting the tube for grid control during the next cycle. Relay 27 must not be fast enough to break the current before relays 28 and 29 have completed their functions.

Relay 28 is normally open. Its function is to connect condenser 25 for a measured negative charge at the end of each cycle. This measured negative charge is $e_{22}$, the output of potentiometer 22. After relay 28 opens, current from contactor 21 flowing through temperature element 24 starts on another cycle, to erase the negative charge from condenser 25.

Now that a complete cycle has been described briefly, a detailed description will follow. As indicated in Figure 1, the contactor 20 is connected to one side of condenser 25 and to the cathode of tube 26. This is a reference from which the grid voltage is measured.

Potentiometer 22 is shaped so that its potential output is:

$$e_{22} = 2BP^xLE \qquad (11)$$

Potentiometer 23 is shaped so that its potential output, measured from the bottom of potentiometer 22, is:

$$e_{23} = AQ^xLE \qquad (12)$$

Usually A is equal to about 50 times B so there is no difficulty in setting the bottom of the air-speed range high enough so that the maximum of voltage $e_{22}$ will be less than the minimum of voltage $e_{23}$. In Equations 11 and 12, A, B and $x$ are set so as to make approximate Equation 10 coincide with accurate Equation 6 at three points. L is a design constant selected to make the maximum value of $e_{23}$ equal to E.

Potentiometer 22 has been shown shorter than potentiometer 23 to represent the lower voltage of potentiometer 22. It is not to be assumed from this that inaccuracies can be tolerated in potentiometer 22. The end result is affected equally by potentiometers 22 and 23. In an actual instrument potentiometer 22 is the same size as potentiometer 23 but the resistance ratio will be on the order of 1 to 25.

It will be assumed for the present that the resistance of resistor 31 is zero. Its function will be described later. The negative charge which is placed on condenser 25 when relay 28 closes is $$e_{22} = 2BP^xLE$$

Immediately after relay 28 opens, the voltage across temperature element 24 is equal to $e_{23}$. When the grid voltage reaches zero, the voltage across temperature element 24 is $e_{23} - e_{22}$. The average voltage across temperature element 24 is:

$$e_{23} - \frac{e_{22}}{2} = (AQ^x - BP^x)LE$$

The average rate of change in the voltage across condenser 25 is $$\frac{de_{25}}{dt} = \frac{(AQ^x - BP^x)LE}{R_{24}C_{25}} \qquad (13)$$

The time of charge W is, $$W = \frac{e_{22}}{de_{25}/dt} = \frac{2BP^xR_{24}C_{25}}{AQ^x - BP^x} \qquad (14)$$

Now if S is made to equal the number of charge-discharge cycles per unit distance traveled, VWS=1, and:

$$V = \frac{1}{WS} = \frac{AQ^x - BP^x}{2BP^x R_{24} C_{25}} \cdot \frac{1}{S} \quad (15)$$

But according to Equation 10, $$V \approxeq \left(\frac{AQ^x - BP^x}{P^x}\right)\sqrt{U} \quad (16)$$

Equating the last two equations and solving for $R_{24}$:

$$R_{24} = \frac{1}{2BCS\sqrt{U}} \quad (17)$$

Therefore, in order to satisfy Equation 10, temperature element 24 must have a negative coefficient and its resistance must vary inversely as the square root of the absolute temperature.

So far it has been assumed that the period of operation W was equal to the positive charging time. This is not exactly true because a small fraction of a second is required for the operation of the relay which connects the condenser to the negative source for negative charging.

This time of operation of relay 28 can be compensated for by inserting a resistance as shown at 31 in Figure 1. The negative charge will then be:

$$2BP^x LE - \frac{R_{31}}{R_{24} + R_{31}} AQ^x LE \quad (18)$$

And the time required to erase this charge, $$W - r = \frac{\left(2BP^x - \frac{R_{31}}{R_{24} + R_{31}} AQ^x\right) R_{24} C_{25}}{(AQ^x - BP^x)} \quad (19)$$

where $r$ is the time required for relay operation. Since $$R_{24} = \frac{1}{2BC_{25}S\sqrt{U}}$$

$$W = \frac{\left(2BP^x - \frac{R_{31}}{R_{24} + R_{31}} AQ^x\right)}{(AQ^x - BP^x) \cdot 2BS\sqrt{U}} + r \quad (20)$$

And according to Equation 16, $$W = \frac{1}{SV} = \frac{P^x}{S(AQ^x - BP^x)} \cdot \frac{1}{\sqrt{U}} \quad (21)$$

Equating the last two values for W, substituting for $R_{24}$ and solving for $R_{31}$, $$R_{31} \approxeq \frac{r}{C_{25}} - \frac{r}{C_{25}} \cdot \frac{BP^x}{AQ^x}$$

Assuming an average value for $$\frac{BP^x}{AQ^x} = 0.04$$

$$R_{31} \approxeq 0.96 \frac{r}{C_{25}} \quad (22)$$

Thus a method of compensation for the time required to charge the condenser negatively is available. It is estimated that this negative charging time will be not more than 2% of the period W and therefore an error of 5% in compensating for it would result in an error of only 0.1% in the result.

Values for $R_{24}$ are on the order of $10^6$ ohms; values for $R_{31}$ are about $10^3$ ohms.

The instrument requires for its operation a continuous voltage supply which, in Figure 1, is indicated as 32—33. The performance of the instrument is not affected by fluctuations in the supply voltage. This is because any change in voltage affects, in like proportion, both the magnitude of the negative charge and the rate of the positive charge.

Figure 2 is an electrical diagram of connections for an alternate integrator. The pressure bellows have not been shown in this figure since the bellows and lever arrangement can be the same as is shown in Figure 1. The contactor on potentiometer 51 is operated by a Pitot-static differential pressure bellows and the contactor on potentiometer 52 is operated by a static pressure bellows. Potentiometer 51 is installed directly across the leads of the direct current supply 48 and 49. Potentiometer 51 is shaped so that the potential output varies directly as $EQ^x$. When double-pole double-throw relay 53 is in the upper or normal position, condenser 54 is charged from the contactor on potentiometer 51, through fixed resistor 55, at a rate which varies directly as $EQ^x$. This statement is made on the assumption that the potential across condenser 54 is at or near zero. This requirement can be satisfied if the output of potentiometer 52 is small as compared to the output of potentiometer 51. When the potential of the grid of thyratron tube 57 reaches a certain value, the anode current increases suddenly, operating relays 53, 58 and 59. The contacts of relay 58 are normally closed, thus priming tube 57 for grid control. When the coil of relay 58 is energized by anode current the contacts open, interrupting the anode current. This relay is adjusted to operate slowly, so that relays 53 and 59 will get sufficient current to complete their functions.

Relay 53, when in the normal or top position, connects condenser 54 in the grid circuit. When relay 53 is energized, condenser 54 is connected across the output of potentiometer 52 for negative charging. Potentiometer 52 is in series with temperature element 63, the temperature coefficient of which is such that the current in potentiometer 52 varies as $E/\sqrt{U}$. Potentiometer 52 is shaped so that the potential output varies as $EP^x/\sqrt{U}$.

When relay 53 operates to connect condenser 54 to the output of potentiometer 52 it is charged to a potential which is proportional to $EP^x/\sqrt{U}$. The purpose of storage condenser 65 is to facilitate rapid negative charging of condenser 54.

When relay 53 is in the top or normal position, the rate at which condenser 54 is charged positively is directly proportional to $EQ^x$ and the necessary change in voltage is $EP^x/\sqrt{U}$, so that the frequency of anode impulses is directly proportional to the true air speed as expressed by Equation 9:

$$V \approxeq A\left(\frac{Q}{P}\right)^x \sqrt{U}$$

By the proper selection of circuit constants, these impulses can therefore be used to integrate the air distance traveled. Solenoid 59 may operate a counter directly, as does the solenoid 29 of Figure 1, or the circuit 62 may be connected to a suitable indicator.

Figure 3 is a schematic diagram of an integrator which satisfies Equation 10. The functioning of the parts of this circuit is much the same as that of corresponding parts of the circuit shown in Figure 1, except that the temperature element 75 is connected differently.

The total resistance and shape of potentiometer 70 is selected so as to satisfy the constant B of Equation 10. That is, its potential output when relay 73 is open is $e_{70}=2BP^xLE$. The total voltage across potentiometer 70 plus the output of potentiometer 71 up to the contactor is $$e_{71}=AQ^xLE$$

Therefore, the average voltage between the contactors, which is the positive charging voltage, is $$e_{71}-\frac{e_{70}}{2}=(AQ^x-BP^x)LE$$

When relay 73 is closed by anode current of thyratron tube 74, temperature element 75 is connected in parallel with potentiometer 70. The coefficient of this temperature element is negative and such that the current in potentiometer 70 varies as $E/\sqrt{U}$. The potential output of potentiometer 70 when relay 73 is closed varies as $EP^x/\sqrt{U}$ and this is the negative charging voltage of condenser 76.

The value of resistance 77 is now set so as to give the desired firing frequency $1/W$ where $$\frac{1}{W} \approx \left(\frac{AQ^x-BP^x}{P^x}\right)\frac{\sqrt{U}}{S} \qquad (23)$$

or $$V \approx \left[A\left(\frac{Q}{P}\right)^x - B\right]\sqrt{U} \qquad (24)$$

The constants A, B and $x$ may be selected so as to obtain coincidence with the accurate curve at three points in accordance with Equation 10.

The functions of relays 78 and 79 and air position indicator circuit 82 are the same as corresponding reference numbers 58, 59 and 62 of Figure 2.

Figure 4 shows graphically the voltage of condenser 25 plotted against time. Neglecting resistor 31 (assuming its resistance to be equal to zero), the negative voltage to which the condenser is charged at the start of a cycle is $-2BP^xLE$. During the positive charge the rate of change in voltage is $$\frac{de}{dt}=\frac{(AQ^x-BP^x)LE}{RC}$$

When the condenser voltage reaches zero the grid voltage is also zero, the tube fires and the relays operate to place another negative charge and start another cycle. It can be seen on Figure 4 that a change in supply voltage affects the negative charging voltage and the rate of charge in like proportion and therefore does not affect the frequency of impulses.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A true air-speed integrator, comprising an electrical circuit including a means providing a direct current voltage supply, first and second potentiometers connected to said voltage supply, a condenser connected to the contactor of said first potentiometer, the other side of said condenser being connected to the contactor of said second potentiometer, a switch operable to connect the said other side of said condenser to the input end of said first potentiometer, and means responsive to a predetermined charge on said condenser for shifting said switch to charge said condenser in the other direction; means responsive to a predetermined charge on said condenser to count the reversals of charge on said condenser as a measure of the air distance traveled; means responsive to static pressure and connected to control the contactor on said first potentiometer so that the voltage output thereof will vary as an exponential function of the static pressure; and means responsive to Pitot-static differential pressure and connected to control the contactor on said second potentiometer so that the voltage output thereof will vary as an exponential function of the Pitot-static differential pressure.

2. A true air-speed integrator, comprising an electrical circuit including a means providing a direct current voltage supply, first and second potentiometers connected to said voltage supply, a condenser connected to the contactor of said first potentiometer, the other side of said condenser being connected to the contactor of said second potentiometer, a switch operable to connect said other side of said condenser to the input end of said first potentiometer, means responsive to a predetermined charge on said condenser for shifting said switch to charge said condenser in the other direction, and a temperature sensitive resistance element connected to said condenser and operable to adjust the frequency of reversals of said condenser in proportion to the square root of the absolute air temperature; means responsive to a predetermined charge on said condenser to count the reversals of charge on said condenser as a measure of the air distance traveled; means responsive to static pressure and connected to control the contactor on said first potentiometer so that the voltage output thereof will vary as an exponential function of the static pressure; and means responsive to Pitot-static differential pressure and connected to control the contactor on said second potentiometer so that the voltage output thereof will vary as an exponential function of the Pitot-static differential pressure.

3. A true air-speed integrator, comprising an electrical circuit including a means providing a direct current voltage supply, first and second potentiometers connected to said voltage supply, a condenser connected to the contactor of said first potentiometer, the other side of said condenser being connected to the contactor of said second potentiometer, a switch operable to connect the said other side of said condenser to the input end of said first potentiometer, means responsive to a predetermined charge on said condenser for shifting said switch to charge said condenser in the other direction, means responsive to said last mentioned means in its operation to count the reversals of charge on said condenser as a measure of the air distance traveled, and a temperature sensitive resistance element connected to said condenser and operable to adjust the frequency of reversals of said condenser in proportion to the square root of the absolute air temperature; means responsive to the static pressure and connected to control the contactor on said first potentiometer so that the voltage output thereof will vary as an exponential function of the static pressure; and means responsive to pitot-static differential pressure and connected to control the contactor on said second potentiometer so that the voltage output thereof will vary as an exponential function of the Pitot-static differential pressure.

4. In a true air-speed integrator, an electrical circuit comprising a source of electricity, a first potentiometer in said circuit, an evacuated static pressure bellows operative to control the contactor on said first potentiometer, a second potentiometer connected at one end to one end of said first potentiometer and at the other end to said source of electricity, a Pitot-static differential pressure bellows operative to control the contactor on said second potentiometer, a condenser in said circuit connected to one of said contactors, mechanism in said circuit connected to the contactor of said second potentiometer for alternately charging said condenser to the voltage output of said first potentiometer and discharging said condenser at a rate which is proportional to the voltage output of said second potentiometer, a resistance in said circuit and sensitive to air temperature for correcting the frequency of said charge-discharge cycles in proportion to the square root of the apparent air temperature, and means responsive to said mechanism for signalling the air distance traveled at a specified number of condenser charging and discharging cycles per unit distance.

5. In a true air-speed integrator, an electrical circuit comprising a source of electricity, a first potentiometer in said circuit, means for operating the contactor on said first potentiometer as a function of the static pressure, a second potentiometer connected at one end to one end of said first potentiometer and at the other end to the said source of electricity, means for operating the contactor on said second potentiometer as a function of the Pitot-static differential pressure, a condenser in said circuit connected to one of said contactors, a temperature sensitive resistance element in said circuit, means in said circuit and connected to the contactor of said second potentiometer for alternately charging said condenser to the voltage output of said first potentiometer and discharging said condenser at a rate which is proportional to the voltage output of said second potentiometer multiplied by the square root of the apparent air temperature, said multiplication being accomplished by the said temperature sensitive resistance element, and means for signalling the distance traveled at a specified number of condenser charge-discharge cycles per unit of distance.

6. A true air-speed integrator, comprising a circuit including a first potentiometer, a source of electricity to which one end of said first potentiometer is connected, a static pressure bellows operative to control the contactor on said first potentiometer so that the voltage output of said first potentiometer will vary as an exponential function of the static pressure, a second potentiometer connected at one end to one end of said first potentiometer and at the other end to said source of electricity, a Pitot-static differential pressure bellows operative to control the contactor on said second potentiometer so that the voltage output of said second potentiometer will vary as an exponential function of the Pitot-static differential pressure, a condenser in said circuit connected to the contactor of one of said potentiometers, switching means connected to the other of said contactors for alternately charging and discharging said condenser, means in said circuit to operate said switching means so that said charging is to the voltage output of said first potentiometer and said discharging is at a rate proportional to a first constant times the voltage output of said second potentiometer minus a second constant times the voltage output of said first potentiometer, and means responsive to said switching means for counting the charge-discharge cycles of said condenser as a measure of the air distance travelled.

JOHN B. PETERSON.

REFERENCES CITED

The following references are of record in the file of this patent:

UNITED STATES PATENTS

| Number | Name | Date |
| --- | --- | --- |
| 1,762,712 | Charlton | June 10, 1930 |
| 2,114,016 | Dimond | Apr. 12, 1938 |
| 2,295,795 | Keeler | Sept. 15, 1942 |
| 2,318,153 | Gilson | May 4, 1943 |